United States Patent [19]

Zwolinski et al.

[11] 4,143,008

[45] Mar. 6, 1979

[54] NOVEL ADHESIVE, MOLDING AND FILLER COMPOSITION INCORPORATING TOLUENE DIISOCYANATE RESIDUE

[75] Inventors: Leon M. Zwolinski, Orchard Park; John W. Frink, Buffalo, both of N.Y.

[73] Assignee: Allied Chemical Corporation, Morris Township, N.J.

[21] Appl. No.: 815,731

[22] Filed: Jul. 14, 1977

Related U.S. Application Data

[63] Continuation-in-part of Ser. No. 541,461, Jan. 16, 1975, abandoned.

[51] Int. Cl.² .................. C08G 18/06; C08L 91/00
[52] U.S. Cl. ..................... 260/18 TN; 260/18 N; 260/453 SP; 528/67; 528/80
[58] Field of Search ............. 260/453 PH, 453 SP, 260/18 N, 75 TN, 75 NK, 75 NT, 75 NE, 18 TN; 528/67, 80

[56] References Cited

U.S. PATENT DOCUMENTS

| | | | |
|---|---|---|---|
| 3,341,462 | 9/1967 | Schultz et al. | 260/77.5 AT |
| 3,359,295 | 12/1967 | Schultz et al. | 260/77.5 AT |
| 3,450,653 | 6/1969 | McClellan | 260/453 N |
| 3,723,363 | 3/1973 | Shaw | 260/75 NT |
| 3,755,215 | 8/1973 | Khoury et al. | 260/75 NT |
| 3,876,728 | 4/1975 | Kuroda et al. | 260/75 NT |

*Primary Examiner*—Allan Lieberman
*Attorney, Agent, or Firm*—Robert J. North; Jay P. Friedenson

[57] ABSTRACT

Novel adhesive, molding and binder compositions are formed from toluene diisocyanate residue which contains from about 12 to about 30% toluene diisocyanate and from about six to about twenty-five percent by weight of unreacted isocyanate groups.

3 Claims, No Drawings

NOVEL ADHESIVE, MOLDING AND FILLER COMPOSITION INCORPORATING TOLUENE DIISOCYANATE RESIDUE

CROSS REFERENCE TO RELATED APPLICATIONS

This application is a continuation in part of copending application Ser. No. 541,461 filed Jan. 16, 1975 by Leon M. Zwolinski and John W. Frink, and now abandoned.

BACKGROUND OF THE INVENTION

1. Field of the Invention

This invention concerns novel adhesive, molding and binder compositions and more particularly relates to the use of readily available, inexpensive isocyanate waste products in such compositions thus reducing pollution by the waste products and making good adhesive, molding and binder compositions available at low cost.

2. Description of the Prior Art

Diisocyanates, and especially toluene diisocyanates, are important industrial products useful in the manufacture of urethane polymers. They are produced commercially by phosgenation of diamines or mixtures thereof in the presence of a solvent followed by distillation to recover solvent and the diisocyanates or mixtures thereof. Unfortunately, distillation of crude toluene diisocyanates leaves a residue of material from which it is difficult to recover a large portion of the toluene diisocyanate and the material containing the TDI is discarded as a waste product. Toluene diisocyanate is manufactured in large quantities, thus disposal of the large quantities of residue wastes has become a serious problem. As used herein TDI refers to toluene diisocyanate; and "TDI residue" as used herein is the residue remaining after vaporizing toluene diisocyanate from a reaction mixture, which results fom substantially complete phosgenation of toluene diamine, until between about 12 and about 30 percent by weight of toluene diisocyanate remains in the residue. The residue includes from about six to about twenty-five weight percent of unreacted isocyanate groups, and is solid at 25° C.

Prior art processes are known for utilizing the undistilled liquid compositions produced from the manufacture of TDI by the phosgenation of toluene diamine. U.S. Pat. No. 3,341,462 (Shultz et al., 1967) describes the use of a relatively pure liquid composition to which a small amount of a polyol may be added during the production of rigid cellular membranes. U.S. Pat. No. 3,450,653 (McClellan, 1969) describes the use of a polyol in reacting with a polymethylene-polyphenyl-isocyanate mixture to produce polyurethane elastomeric sealants. U.S. Pat. No. 3,755,215 (Khoury et al., 1973) describes the use of a TDI liquid composition for preparing polyurethane foams.

U.S. Pat. No. 3,876,278 (Kuroda et al., 1975) prepares a cured resin by reacting an active hydrogen containing compound with an NCO group-containing distillation residue (TDI residue) obtained in the production of tolylene diamine, in the presence of a polymerizable unsaturated monomer and polymerization catalyst, wherein the resin has adhesive properties. However, the authors state that a satisfactory adhesive resin is not produced by reacting the TDI residue directly with a hydroxyl group-containing compound.

SUMMARY DESCRIPTION OF THE INVENTION

In accordance with this invention we have found that the TDI residue can be utilized as a binder material when in finely divided form and also can be utilized to form adhesive, molding and binder compositions which comprise as an active ingredient thereof, up to about 95 weight percent of TDI residue and about 5 weight percent of a component which is free from toluene diisocyanate. "Finely divided" as used herein means having an average particle size smaller than about 40 mesh. "Active ingredient" as used herein is intended to denote amounts greater than 0.5 percent by weight and, preferably, at least about 7% by weight of an ingredient which increases the cohesive or adhesive strength of the composition. The TDI free portion of the composition may be any inert substance adhered or bound by the TDI residue, a solvent for the TDI residue or an active ingredient other than TDI residue.

The unreacted isocyanate groups in the TDI residue permit the formation of chemical bonds which create strong attachment of the residue to a substrate to be bonded. Similarly, these unreacted isocyanate groups permit the formation of thermosetting molding compositions, and strong, dimensionally stable, cross-linked binders.

DETAILED DESCRIPTION OF THE INVENTION

The TDI residue used in the compositions and methods of the invention are manufactured by substantially complete phosgenation of toluene diamine in a known manner to form a reaction mixture. "Substantially complete phosgenation" as used herein means that less than one weight percent of un-phosgenated toluene diamine remains in the reaction mixture. Toluene diisocyanate is removed from the resulting reaction mixture by evaporation, preferably at sub-atmospheric pressure. It is not economically feasible to remove all of the formed TDI. As a result, depending upon the particular mixture the accepted practice has been to continue evaporation of TDI until about 12 to about 30% of toluene diisocyanate remains. The remaining material is the TDI residue used in the invention. At sub-atmospheric pressure the temperature of the reaction mixture will generally be above 140° C. and below 200° C. during evaporation of the toluene diisocyanate, which as indicated, proceeds until between about 12 to about 30% of TDI remains in the residue. The viscosity of the TDI residue at these temperatures is above about 150 centipose. At room temperature the TDI residue becomes a hard solid. The TDI residue has been found to contain from about six to about twenty-five percent by weight of unreacted isocyanate groups. Additionally, the TDI residue has been found to contain carbodiimide linkages which are believed to be formed by the following reaction

$$2\ RNCO \longrightarrow RN{=}C{=}NR + CO_2$$
Isocyanate    Carbodiimide (CDI)

It is postulated that the carbodiimide then reacts with toluene diisocyanate (TDI) to form an adduct

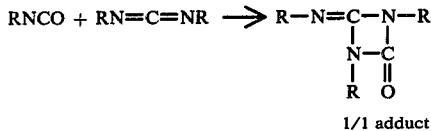

1/1 adduct

Other chemical compounds such as poly-isocyanates, which are products containing more than two isocyanate groups, occur in the TDI residue as a natural result of the phosgenation reaction and distillation operations.

The TDI residue is characterized by being thermosetting. Upon exposure to atmospheric moisture it will react to form a highly cross-linked, insoluble composition substantially free from reactive isocyanate groups. Furthermore, unreacted TDI residue is soluble up to at least 20% by weight in dimethyl formamide and up to at least 40% by weight in ortho-dichlorobenzene. TDI residue is also soluble in toluene, xylene, monochlorobenzene and cyclohexanone in percentages below 20%. TDI residue is slightly soluble in methylene chloride, methyl ethyl ketone, benzene and trichloroethanes. Virtually no solubility is shown for TDI residue in petroleum naphtha, ethyl acetate and tetrahydrofuran.

It has now been found that these TDI residues have utility as adhesives at room temperature and as hot melt compositions. For example, up to about 95% by weight of solids in an adhesive composition can be TDI residue. Generally, when employed as an adhesive, at least 5% of modifiers are added to the TDI residue to increase flexibility and reduce brittleness. Adhesive modifiers are well known in the art and selection thereof will be apparent to the artisan, depending on the specific desired use. For example, materials which can be incorporated, or reacted, with the finely divided TDi residue to increase flexibility and reduce brittleness are polyhydroxy organic compositions such as tall oil or hydroxy terminated phthalic anhydride-diethylene glycol condensates. At least about 90 numerical percent of hydroxy groups in these polyhydroxy organic composition are attached to aliphatic carbon atoms. Since the hydroxy groups of the polyhydroxy composition react with the available isocyanate groups in the TDI residue it is preferred that only sufficient polyhydroxy organic composition be used to react with up to about 85 numerical percent of the reactive isocyanate groups in the residue leaving the remaining isocyanate groups free to react with a substrate, if so desired.

In order to produce a satisfactory adhesive, incorporating a polyhydroxy organic composition as a modifier, the TDI residue must be smaller in average particle size than about 40 mesh. This is necessary to insure uniformity of the obtained adhesive during melt blending or compression molding processing of the melt in which up to about 85 numerical percent of the unreacted isocyanate groups in the residue are reacted with the hydroxy groups of the polyhydroxy organic composition. Larger particle sizes lead to non-uniform adhesive compositions having inferior adhesive properties due to localized regions of TDI residue in the composition being nonreacted with polyhydroxy organic composition. This limitation on particle size is also applicable to adhesive compositions made from TDI residue and polyhydroxy organic compositions from a solution process, because average particle sizes larger than 40 mesh of TDI residue require considerably extended periods of time for dissolution to occur which may lead to degradation of the TDI adhesive properties by air oxidation.

It has similarly been found that up to about 30% of the TDI residue can be added to polymers to produce adhesive materials by improving the adhesive of the polymeric material to substrates. For example, the TDI residue can be added to polymers, copolymers or mixtures or blends thereof. A preferred class of such polymeric materials are polymers at least partially manufactured from a monomer selected from glycols, polyfunctional carboxylic acids, vinyl acetate, butadiene, styrene, isoprene and chloroprene. As used herein "partially manufactured" means that the polymer contains groups derived from one or more of the above monomers, which groups comprise at least ten weight percent of the polymer.

Adhesives prepared by incorporating TDI residue can be used to bind a large variety of materials and may be either solvent adhesives, non-solvent room temperature adhesives or hot melt adhesives. The adhesives may be used to bind a wide variety of materials including polyethylene, polypropylene, polyamides, paper, wood, cellulose, metals and glass. Particularly good adhesives for binding all of the above materials are made from a composition comprising rubber cement and TDI residue, wherein the TDI residue comprises between about 1 and about 20 weight percent of the adhesive composition.

It has also been found that TDI residue can effectively be used in molding compositions. The thermosetting characteristics of the TDI residue provides strength when combined with known molding materials and yet does not affect their other properties. Any known molding composition can be combined with TDI residue in accordance with this invention provided that the molding composition does not contain functional groups which would react with the TDI residue to the detriment of the overall properties. For example, mixtures of TDI residue and hydroxy terminated polyesters upon compression or injection molding form strong, flexible molded products.

TDI residue may also be used, either alone or in conjunction with other materials, as a binder composition having adhesive charcter. For example, the addition of TDI residue to rubber used for making tires, improves adhesion of the tire cords.

TDI residue, when mixed with sawdust forms a thermosetting molding compound which, at pressures of from about 100 to about 5,000 pounds per square inch for from about one to about fifteen minutes at a temperature of from about 200° F. to about 350° F., will react with the hydroxyl groups in the sawdust to form a molded thermoset product useful for ornamentation and other applications.

When carbon black is to be used as a filler, it has been discovered that the incorporation of 10% or less of TDI residue in conjunction with the carbon black is effective in assisting the adhesion of the carbon black to the filled material. Higher percentages of TDI residue may be used, although it is generally preferable to employ 90% or more of carbon black. Other inert materials may be used in conjunction with TDI residue as a binding material having adhesive character, for example TDI residue may be used with calcium carbonate, activated carbon, sawdust and various fibers such as cellulose acetate. When used as a binder or in conjunction with binder materials, the TDI residue should have a particle size smaller than about 40 mesh.

TDI residue also has utility as a preservative. When a solution containing up to about 40 weight percent TDI residue is applied to wood, the solution has excellent penetration into the wood and gives the wood improved resistance to moisture, salt spray and weathering. Dimethylformamide, ortho-dichlorobenzene, toluene, xylene, monochlorobenzene and cyclohexanone are examples of solvents suitable for dissolving TDI residue for application to wood.

From about one to about thirty weight percent of TDI residue and preferably from about five to about fifteen weight percent TDI residue in conjunction with from about 70 to about 99 weight percent sand and preferably from about 85 to about 99 weight percent and serves as an effective, inexpensive binder for the sand to form foundry molds.

Unless otherwise indicated all parts and percentages in the following illustrative examples are by weight of total composition.

EXAMPLE 1

A rubber cement containing 40% by weight of butadiene rubber in toluene is prepared. Two 2 inch by 7 inch strips of cotton duck fabric are masked on one end with 2 inch by 2 inch strips of tape. The cement to be tested is spread thinly in equal amounts onto the exposed fabric on the taped side of each of the two strips of the cotton duck, so that the entire fabirc surface is coated. The specimens are then air-dried for about 3 minutes until almost tack free and then joined together on the coated sides and rolled several times with a roller. The specimens are then cured overnight at 110° F. The adhesion of the strips is then tested. The ruber cement has a 5.0/lb./2 inch width strength.

To 90 parts by weight of the rubber cement prepared above is added 10 parts by weight of a 40% solution of TDI residue in O-dichlorobenzene to form an adhesive composition. Two 2 inch by 7 inch strips of cotton duck are prepared with the adhesive containing TDI residue using the above method. The strength of the bond is found to be 9.2 lb./2 inch width.

EXAMPLE 2

A composition suitable for use as laminating adhesive, or a compression molding material for solid polymer structures is prepared by blending, 1 part by weight of finely ground, smaller than 40 mesh, TDI residue with 2 parts by weight of a high molecular weight hydroxy terminated polyester resin. The mixture is compressed at 2,000 psi at 300° F. for three minutes. A solid, stiff, dry-feeling, amber colored urethane polymer film is produced. The film is flexible without cracking over a 90° radius and no odor of free isocyanate is detected. The composition prior to molding is found to be an effective hot melt adhesive.

EXAMPLE 3

An asphalt composition with improved hardness is prepared by combining petroleum asphalt and TDI residue.

200 grams of the asphalt alone is melted, heated to about (90°–100° C.), poured into a sample container, and allowed to cool. Similarly, an asphalt/TDI residue composition is prepared by adding 50 grams of powdered TDI residue to 200 grams of the molten asphalt, and stirring the mass for 30 minutes at about 125° C. Most of the TDI residue dissolves, with some minor amounts of solids remaining. The liquid asphalt/TDI residue is then poured into a sample container, and allowed to cool. Both specimens are tested after 24 hours. The improved hardness is indicated in the case of the asphalt/TDI residue composition by a lower penetration value. (Penetration of probe as per test with 100 gram load in 5 seconds).

| Formulation (grams) | A | B |
|---|---|---|
| Asphalt | 200 | 200 |
| TDI Residue | — | 50 |
| Penetration, (mm) ASTM D5-65 | 41 | 34 |

The asphalt/TDI residue preparation is shown to be a good paper laminating material. The hot composition is knifed on one side of heavy beown untreated kraft paper and a second sheet is immediately nipped onto the coated paper sheet. After cooling, the resulting lamination is found to be well adhered.

EXAMPLE 4

To monochlorobenzene (85 gms.), TDI residue (15 gms.) is added and the resulting mixture is stirred until at least 80 weight percent of the solid TDI residue is dissolved. Three grams of polyoxypropylene diamine having an average molecular weight of about 2,000 is then dissolved in the mixture. 3" × 4" pieces of brown kraft paper are thoroughly saturated with the resulting solution. The paper is then removed and air dried. The impregnated kraft paper specimens are dry to the touch after 24 hours of air drying. Five of the dried pieces of kraft paper are then stacked together and pressed at 2000 psi and 300° F. for 10 minutes. The resultant composite is a tightly laminated structure that is tough and flexible and cannot be delaminated. A sample of the laminate does not dissolve or break apart in monochlorobenzene indicating a thermoset binding has been effected by the reaction of TDI residue. Such laminates are useful for packaging, electrical insulation, construction and other industrial applications.

EXAMPLE 5

Solid TDI residue and finely ground pine wood dust are mixed in a 5 to 1 ratio by weight. This mixture is ball milled for one hour. The thoroughly blended mixture is then loaded to excess into a 7" × 7" × ¼" steel mold and is compressed under 1000 psi pressure for 5 minutes with 300° F. heat applied. The resultant solid molding is a true thermoset material (does not disintegrate in monochlorobenzene) and is hard and dry. Articles such as electrical receptacles can be made from the modling compound.

EXAMPLE 6

A molding compound is prepared by mixing 8 grams of TDI residue, 1.6 grams of polyoxypropylene diamine having a molecular weight of about 2000 to 4.8 grams of fibrous pine wood shavings. The mixture is compression molded at 2000 psi at 300° F. for 10 minutes in a 4" × ¼" × ¼" steel mold filled to excess. The resulting solid, hard thermoset molded bar does not dissolve in monochlorobenzene. The resulting solid has utility in the manufacture of particle board used as a building material.

EXAMPLE 7

A solution of 20% TDI residue (by weight of solution) in orthodichlorobenzene solvent is prepared. The solution is analyzed for isocyanate content by amine titration and is found to contain 3.3% isocyanate. 100 gms of dried foundry sand is weighed into a container and 15 gms of the above solution is added to give the equivalent of 3% dry residue based on the sand weight. The mixture is stirred vigorously with a motor driven mixer to insure the sand is completely wetted by the TDI residue solution. The treated sand is then compacted and baked for two hours at about 150° C. to drive off the solvent. After the mixture is cooled, a solid, hard sand block is removed from the container. Surfaces of the block that had been in contact with the container are glass smooth and extremely non-friable. Thus TDI residue has application as a low cost binder for foundry sand.

EXAMPLE 8

1.1 grams of a propylene oxide adduct of trimethylolpropane having a molecular weight of approximately 418 is vigorously mixed with 100 gms dried foundry sand, using a motor driven mixer to insure thorough wetting of the same by the adduct. 9.7 gms of TDI residue solution as described in Example 7 is added to the sand/polyether polyol mixture and mixed vigorously as before. The amounts of materials used give an equivalent of 3% dry binder (TDI residue + adduct) based on the sand weight and an isocyanate to hydroxyl ratio of approximately 1:1. The mixture is compacted, baked and cooled as described in Example 7. A solid, very hard sand block is removed from the container. Surfaces that had been in contact with the container are glass smooth and extremely non-friable. Thus TDI residue, in combination with a polyhydroxy resin, has application as a low cost binder for foundry sand.

EXAMPLE 9

1.0 gms of a tris-hydroxyethylated isocyanuric acid (polyhydroxy resin) having a molecular weight of approximately 420 is vigorously mixed with 100 gms foundry sand using a motor driven mixer and a small amount of external heating to insure thorough wetting of the sand by the resin. After the sand/resin mixture is cooled, 10.0 gms of the TDI residue solution described in Example 7 is added and the material is mixed vigorously as before. The amounts of materials used give an equivalent of 3% dry binder (TDI residue + polyhydroxy resin) based on the sand weight and an isocyanate to hydroxyl ratio of approximately 1:1. The mixture is compacted, baked and cooled as described in Example 7. A solid, very hard sand block is removed from the container. Surfaces that had been in contact with the container are glassy smooth and extremely non-friable.

EXAMPLE 10

A solution of 20% TDI residue (by weight of solution) in orthodichlorobenzene is prepared. A four inch length of a white pine 2" × 4" board is totally immersed in the solution and held overnight. After removal from the solution, the pine block is dried at about 150° C. for several hours. Cutting of the block through the center revealed a dark color throughout the wood. This indicates that the solution had permeated the wood, leaving TDI residue well impregnated throughout. This gives the wood improved resistance to moisture, salt spray and weathering.

EXAMPLE 11

Four samples of coal tar having materials boiling below about 250° C. removed are weighed into sample containers. To three of the coal tar samples are added 5, 10 and 25 grams, respectively, of ground TDI residue per 100 grams coal tar. These three samples are heated and are stirred by hand at 85°–100° C. for approximately one hour and are allowed to cool. Relative softness (or tackiness) of the unmodified coal tar and of the three coal tar samples with TDI residue added are determined after 20 hours standing by penetration as described in Example 3. Results are as follows:

| Sample | Penetration of Bituminous Material (mm) ASTM D5-65 |
| --- | --- |
| Coal Tar | 16.0 |
| 100 parts coal Tar + 5 parts TDI Residue | 4.0 |
| 100 parts Coal Tar + 10 parts TDI Residue | 1.0 |
| 100 parts Coal Tar + 25 parts TDI Residue | 0.3 |

The addition of TDI residue to the coal tar has increased its hardness (i.e. lowered its penetration value).

We claim:

1. A composition of matter consisting essentially of a reaction product of TDI residue with polyhydroxy organic composition wherein at least about 90 numerical percent of the hydroxy groups are attached to aliphatic carbon atoms, sufficient polyhydroxy organic composition being provided to react with up to about 85 numerical percent of the reactive isocyanate groups in said residue, said TDI residue being that residue remaining after vaporizing toluene diisocyanate from a reaction mixture, which results from substantially completely phosgenating toluene diamine until between about 12 and about 30 percent by weight of toluene diisocyanate remains in the residue, said residue including from about six to about twenty-five weight percent of unreacted isocyanate groups, being solid at 25° C. and in average particle size smaller than about 40 mesh.

2. The composition claimed in claim 1 wherein said polyhydroxy organic composition is selected from the group consisting of tall oil, and hydroxy terminated phthalic anhydridediethylene glycol condensate.

3. The composition claimed in claim 1 wherein said organic composition is a hydroxy terminated polyester.

* * * * *